April 17, 1951 — C. F. HILL ET AL — 2,549,309
ENCAPSULATED MEMBER

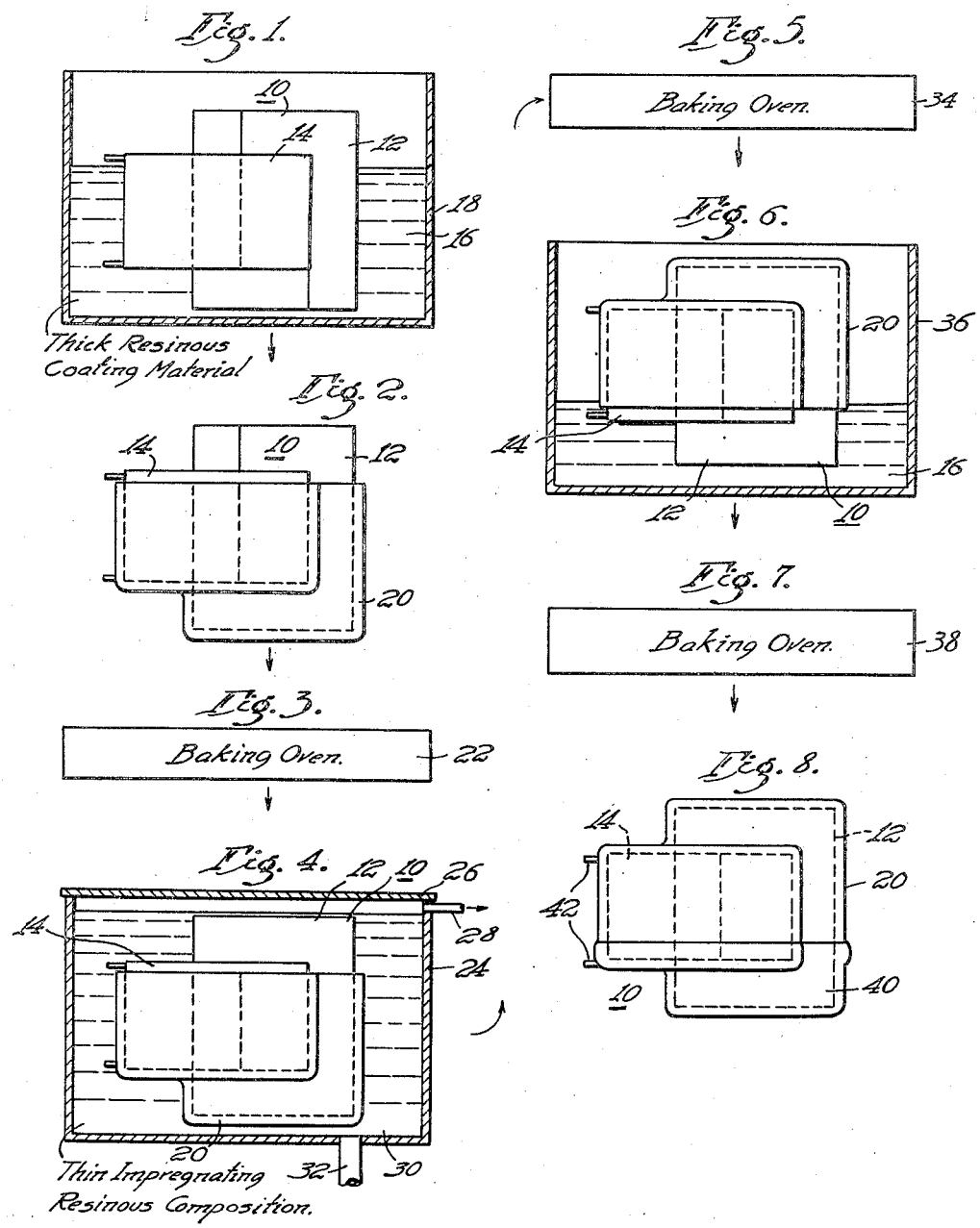

Original Filed Feb. 25, 1944 — 2 Sheets-Sheet 2

WITNESSES:

INVENTORS
Charles F. Hill and
Newton C. Foster.
BY Frederick Shapoe
ATTORNEY

Patented Apr. 17, 1951

2,549,309

UNITED STATES PATENT OFFICE 2,549,309

ENCAPSULATED MEMBER

Charles F. Hill and Newton C. Foster, Pittsburgh, Pa., assignors to Westinghouse Electric Corporation, East Pittsburgh, Pa., a corporation of Pennsylvania Original application February 25, 1944, Serial No. 523,948, now Patent No. 2,414,525, dated January 21, 1947. Divided and this application September 24, 1946, Serial No. 698,972

5 Claims. (Cl. 175—21)

This invention relates to the insulation of electrical members.

This invention relates more particularly to the article produced by encapsulating electrical members with insulating resinous substances wherein the interstices of electrical members are substantially completely impregnated with a solid resinous composition and the exterior surface of the member carries a complete, resilient, weather-resisting coating of resinous material thereon.

This application is a division of our copending patent application, Serial No. 523,948, filed February 25, 1944, entitled "Process of Applying Insulation," which issued as Patent No. 2,414,525 on January 21, 1947.

An important problem in the manufacture of electrical apparatus is the application thereto of electrical insulation. The insulation serves not only to electrically insulate conductors and other members from one another, but serves likewise to protect the apparatus from the undesirable effects of weather and moisture or water in particular. It is a well known phenomenon that some insulation applied to electrical members may function satisfactorily when dry, but when exposed to moisture will absorb it and lose its electrical resistance properties or deteriorate in other characteristics. In some cases the insulating requirements for electrical members require that immersion in water should have no significant adverse effects upon the operation thereof. Electrical members such as coils, transformers, motors, capacitors and similar devices are frequently located in exposed conditions where they may be subject to rainfall, inundation by water, various corrosive atmospheres, metallic dusts, and the like. It is particularly desirable that insulation applied to the apparatus should protect the conductors under these adverse conditions whereby normal functioning of the apparatus is maintained.

According to the present invention, electrical members are effectively encapsulated substantially completely with resinous insulating materials capable of withstanding a wide range of temperatures, various atmospheres and water. The encapsulation provides a flexible, weather-resisting exterior coating that will be unaffected by the normal operation of the apparatus and will withstand ordinary wear and tear without cracking, chipping or flaking off. The interior of the electrical member is completely impregnated to provide good electrical insulation, good thermal conductivity to remove heat developed during operation and a high degree of protection against the elements and moisture.

Briefly, the process of encapsulation according to the present invention is based on the application to the outer surface of an electrical member a thin, non-porous coating of resinous material that closely follows the contours of the member and bridges gaps in the member to provide over a major portion of the outer surface a cup-like shell which, when suitably hardened, will hold a thin, penetrating resin impregnating the interstices of the member whereby the latter resin may be polymerized to give a substantially solid impregnation. Subsequently the outer coating may be completed.

The object of this invention is to provide encapsulated electrical members by treatment with electrically insulating resinous substances whereby the members are impregnated substantially completely with a resinous insulating composition and the outer surface thereof is coated with a resilient weather-resisting resinous material.

Another object of the invention is to provide electrical members having resinous insulating material applied thereto to impregnate substantially completely the interstices thereof, thereby maintaining high electrical insulating efficiency under all conditions.

Other objects of the invention will, in part, be obvious and will, in part, appear hereinafter.

For a fuller understanding of the nature and objects of the invention reference should be had to the following figures of the drawing, in which Figures 1 to 8 illustrate one sequence of steps carrying out the invention and Figs. 9 to 15 illustrate a modified process.

Figure 1 is an elevational view, partly in section.

Fig. 2 is a view in elevation.

Fig. 3 is a schematic showing of a baking oven.

Fig. 4 is an elevational view, partly in section.

Fig. 5 is a schematic showing of a baking oven.

Fig. 6 is an elevational view, partly in section.

Fig. 7 is a schematic showing of a baking oven.

Fig. 8 is a view in elevation of a completed insulated member.

Figure 9:
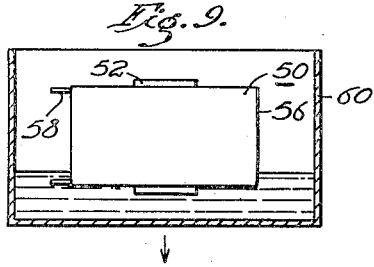
Fig. 9 is a view in elevation, partly in section.
Figure 13:
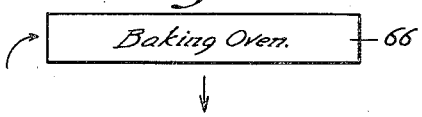
Fig. 13 is a schematic view of a baking oven.
Figure 10:
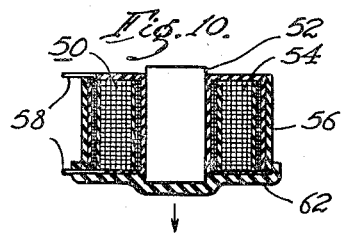
Fig. 10 is a cross-sectional view of a partially treated coil and core.
Figure 14:
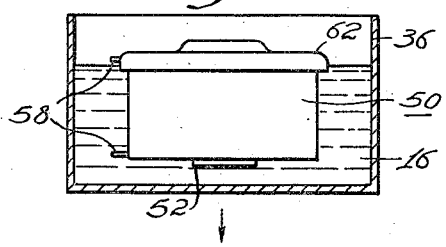
Fig. 14 is a view in elevation, partly in section.
Figure 11:
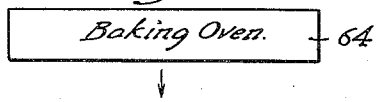
Fig. 11 is a schematic view of an oven.
Figure 12:
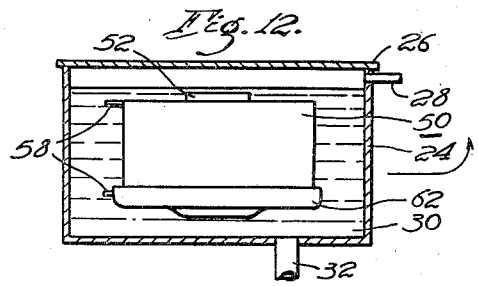
Fig. 12 is a view in elevation, partly in section.
Figure 15:
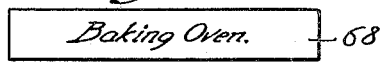
Fig. 15 is a schematic view of a baking oven.

As shown in the processes of Figs. 1 to 8 and 9 to 15, respectively, the process of encapsulation comprises essentially the steps of applying an initial cup-like shell of a relatively thick resinous material to more than half the height of the member upon the exterior of the member being insulated, polymerizing the resinous material, impregnating the member with a fluid penetrating solventless type of resin composition, the shell serving to hold the penetrating resin in the member, hardening the resinous composition and completing the outer shell by applying an overlapping coating or shell of the thick resinous material to cover the entire surface of the electrical member with the relatively thick resin.

In the preferred embodiment of the invention in carrying out the process of encapsulation, two distinct types of resinous insulating materials may be employed. In order to provide the outer shell about an electrical member, a relatively thick resinous material having thixotropic properties is desirable. The relatively thick resinous material should be capable of bridging small gaps, such, for example, as of the order of $\frac{1}{16}$" width without penetrating far into the fine interstices that may exist in normally wound coils and the like. Generally, the thick resinous material carries a filler composed of finely divided inorganic solid material in order to enable the building up of a relatively thick outer protective coating which may be from 5 mils to $\frac{1}{16}$" or more in thickness. A too-thick coating compared to the size of the member obviously may be subject to cracking due to thermal expansion of the various elements of the encased member and may lack a certain degree of required flexibility. In the case of relatively large members, such, for example, as large generator coils, such exterior coating of thick resin may be reinforced by means of tapes of inorganic fibrous material to provide for adequate mechanical characteristics.

For impregnating the interstices of the interior of the electrical member, a relatively thin, fluid resinous composition substantially free of solvents requiring evaporation during the process of hardening the resin is requisite. Such resinous compositions are commonly known as "solventless" compositions, though in fact a solvent composed of a reacting substance is present. The presence of any filler material is generally undesirable since the penetration of the resin into the interstices in the article being impregnated may be hindered. During hardening, the solventless resinous composition should give off no moisture of condensation or other gaseous products, since these will tend to cause gas pockets and otherwise deleteriously affect the insulation of the member. In other words, in preparing the composition, it should be kept in mind that it should be of such a nature that when polymerizing it does not produce moisture or other gaseous products. The composition should harden or polymerize without any significant change in volume over that occupied while in the liquid state. A volume shrinkage of up to 10% is not objectionable in the process of encapsulation.

A number of resinous materials have been discovered which may be employed with satisfactory results in the process of encapsulating electrical members. The following examples are typical of compositions which have been employed with good results to produce the outer coating.

*Example No. I*

A resin composed of:

100 parts by weight of castor oil
30 parts by weight of maleic anhydride was prepared by heating the mixture at 120° C. for several hours to produce a castor oil-maleate of a molasses-like consistency. About 60 parts by weight of the cooled castor oil-maleate was dissolved in 30 parts by weight of monomeric styrene plus 0.02% of hydroquinone to inhibit premature polymerization. A resinous solution of the consistency of thin oil was so produced. In order to enhance the thixotropic properties of the solution, 65 parts by weight of the solution was admixed in an evacuated flask with 35 parts by weight of 325 mesh mica and 1% of benzoyl peroxide catalyst based on the weight of the resinous components. A thick, golden-brown resinous material was produced by the process.

The resinous material was applied by dipping small transformer assemblies therein to provide a resinous shell or surface coating thereon. Although the material did not have a very high viscosity, it appeared to possess marked thixotropic properties, since, after baking for eight hours, each transformer assembly was found to be coated both on the sides and bottom with a uniform coating about 14 mils in thickness. Heat treatment converted the material into a thermoset solid body. The resin shrunk slightly in volume upon polymerizing to the solid state. Gaps in the coil member were completely bridged by the coating.

The castor oil-maleate-styrene resin has an exceptionally flat hardness-temperature curve. Durometer measurements of one sample at 28° C. gave values of 80 while at 100° C. the value was 70. This relatively small change in hardness over this range of temperatures is a particularly valuable feature.

Oils and many other petroleum products exert no solvent effect on this family of resins.

*Example No. II*

A resin composed of:

61 parts by weight of linseed oil
15.8 parts by weight of castor oil
23.2 parts by weight of maleic anhydride was produced by heating the mixture for eight hours at 175° C. to 200° C. 75 parts of this resin were dissolved in 25 parts of monomeric styrene and 0.03% hydroquinone inhibitor and 1% by weight of benzoyl peroxide catalyst was added.

When the resinous material is for coating or encapsulating some article such as a transformer, powdered mica may be incorporated in the resin solution in an evacuated flask in the proportion of 35 parts of mica to 65 parts of the solution. In applying the resinous material a transformer unit was coated and baked 12 hours at 130° C. The resulting coating was substantially uniform in thickness and bridged all the gaps in the transformer core and coils. The coating was softer and more flexible than that described in Example I, but exhibited a tough, oxidized surface skin.

*Example No. III*

A mixture of:

20 parts by weight of castor oil
60 parts of linseed oil
20 parts of peanut oil
30 parts of maleic anhydride was heated at a temperature of 175° C. for eight hours to a thick sirupy state. The reaction product was dissolved in 30 parts by weight of monostyrene to 70 parts by weight of the linseed-castor oil-peanut oil maleate and 1% benzoyl peroxide was added. Next 60 parts by weight of the resin and 40 parts by weight of 325 mesh mica dust was combined in an evacuated flask. A thixotropic resinous material was produced that gave coating similar to those described in Examples I and II. The presence of the peanut oil prevented undue oxidation of the surface as compared to that produced on the linseed oil-castor oil resin of Example No. II. The proportion of peanut oil may be increased or decreased to meet requirements.

Drying oils such as perilla oil, soybean oil, cotton-seed oil, corn oil, cashew nut shell oil and the like may be used to replace all or part of the linseed oil of Example II. The proportion of castor oil and linseed oil or other drying oil may be modified to provide for different degrees of oxidation of the outer surface depending on conditions to be met. Various non-drying oils may replace all or part of the peanut oil.

As described in the copending patent application of N. Foster entitled Synthetic Resin Compositions, filed November 7, 1941, Serial No. 418,153, now abandoned, tung and oiticica oils as well as alkyds may be combined with the castor oil-maleate or castor oil-maleate-drying oil resins as described herein to provide for different degrees of flexibility.

The resins of Examples I to III are specific to maleic anhydride as one of the reactants. However, fumaric acid, citraconic acid and mesaconic acid, maleic acid and other ethylene alpha-beta dicarboxylic acids and their anhydrides may replace all or parts of the maleic anhydride.

Monomeric styrene is employed both as a solvent and as a reacting component with the castor oil-maleate type of resin to produce infusible thermoset resinous bodies. Nuclearly chlorinated monostyrenes are equally effective for this purpose as are simple methyl substituted styrenes. Thus monomeric para-methyl-styrene will dissolve castor oil-maleates and subsequently co-react to form resilient thermoset resinous solids therewith. Distyrene is also an example of other usable reacting solvents.

Other liquid polymerizable monomeric compounds having the group $H_2C=C<$ are capable of dissolving the castor oil-maleates and oil modified castor oil-maleates and polymerizing therewith. Examples of typical polymerizable monomeric compounds suitable for this purpose are alpha methyl styrene, vinyl acetate, methyl vinyl ketone, acrylic nitrite, methyl methacrylate and allyl esters such as diallyl phthalate.

Various peroxides and ozonides may be employed as catalysts in lieu of benzoyl peroxide.

It has been found that a finely divided flake-like material such as mica flakes in an amount of from about 25% to 50% by weight gives improved thixotropic properties for the purpose of this application. However, other finely divided insulating inorganic materials such as powdered asbestos, silica, powdered glass and the like may be added in amounts of from 25% up to 50% and higher. In some cases conducting solid material in finely divided form, such as carbon or graphite may be incorporated in the outer coating material to provide for reducing or preventing corona.

A number of solventless resinous compositions have been employed in impregnating electrical members after the exterior has been provided with a cup-like shell by means of the relatively thick resin solutions in the three examples above given. The castor oil-maleates or the linseed-castor oil-maleates of Examples I and II are dissolved in larger proportions of monostyrene to produce sufficiently thin compositions. The proportion of 50 parts to 90 parts by weight of monostyrene and from 50 parts to 10 parts of the castor oil-maleate will produce a suitably thin fluid solution. No filler is added since this would impair the penetrating qualities of the resinous composition.

Referring to Figs. 1 to 8 of the drawings, there is illustrated one mode of carrying forward the encapsulating process. In Fig. 1, the electrical transformer member 10 composed of a magnetic core 12 and a coil 14 is dipped into the thick resinous castor oil-maleate-styrene coating material 16 present in the tank 18 to cover a major proportion of the outside surface of the member. Since the coil 14 presents the more critical insulation problem, the thick resinous material is applied just short of the top of the coil 14.

When removed from the tank 18, the member 10 has the coating 20 of the resinous material over the lower portion thereof disposed as a thick imperforate layer closely conforming to the contour of the member. By reason of the thixotropic properties of the resin 16 the coating 20 will not drip to a great extent. When placed in the baking oven 22 of Fig. 3, the castor oil-maleate-styrene resin polymerizes into a thermoset infusible material. Thus an imperforate cup-like shell of resin is provided about the electrical member.

The electrical member 10 is then placed within the impregnating tank 24 which can be hermetically sealed by means of the cover 26 and all the air and moisture evacuated by the line 28. After being subjected to evacuation, the tank can be filled with the thin penetrating resinous composition 30 introduced into the tank 24 by means of the conduit 32. The thin resinous material, after it has risen past the top of the shell formed by the outer coating 20, will flow inside the cup-like shell and fill substantially all the interstices of the member 10. The impregnated member 10 is removed from the tank 24 and placed in the baking oven 34 where the resinous composition 30 is caused to polymerize into a solid thermoset impregnation without any gas pockets.

After baking, the coated and filled member 10 is inverted and dipped into the thick resinous coating material 16 in tank 36 to a level whereby the newly applied coating overlaps the original coating 20. After baking in the oven 38, the completed core 10 exhibits an exterior outer surface completely protected by the overlapping coatings 20 and 40 of the thick resinous material. Obviously, the coating 40 may be applied to the entire outer surface. Even the leads 42 are coated with the resinous material in such a manner than an airtight seal is produced.

The complete units have been cut in two. Examination shows practically complete filling. The encapsulating process of the present invention enables accommodation of the various resins to one another and to the member so that the slight shrinkage of the penetrating resin produces no apparent porosity internally.

Units such as the insulated electrical member 10 shown in Fig. 8 have been subjected to a water test in which the entire unit has been immersed in saturated salt water at 65° C. for two hours, transferred to a saturated salt solution of 0° C. for two hours and the immersion repeated four times for a total time of 20 hours. At the end of the treatment, the transformer exhibited a resistance of as much as 100,000 megohms between ground and windings when tested at 500 volts with direct current. These results are practically identical with those of tests made on the transformer before the immersion treatment.

The encapsulated members will withstand adverse conditions of both temperature and usually deleterious atmospheres with success.

In many cases magnetic coils and the like are provided with heavy impermeable seamless paper or other covering about a portion thereof. In such a case the application of the first coating of thick resinous material may be effected to take advantage of the impervious material applied thereto. As illustrated in Fig. 9, the magnetic coil 50 comprising a core 52, a coil 54 (shown in Fig. 10), and a cylindrical impervious insulating paper collar 56 about the coil is dipped in the thick resinous material 16 in the tank 60 just beyond the lower level of the collar 56. As shown in cross section in Fig. 10, the thick resinous material forms a coating 62 about one conductor 58 and overlaps the insulating paper covering 56, whereby a liquid tight cup is produced. After baking in an oven 64 to polymerize the resin 62, the magnetic coil 50 is placed in the impregnating tank 24 containing the thin penetrating resinous composition 30 where it may be subjected to vacuum treatment to obtain a complete impregnation of the interstices of the coil 50. After baking in the oven 66, the impregnated magnetic coil 50 is inverted and dipped into the thick resinous composition 16 in the tank 36 to a level such that the original coating 62 is below the surface of the composition 16. After baking in the oven 68, a completely insulated and impregnated magnetic core is produced similar to that shown in Fig. 8.

It is highly economical to combine in the series of steps shown in Figs. 1 to 8 of the drawings, for example, the process of applying both the exterior protective coating 20—40 with the steps of applying the interior impregnating resin 30. Alternatively in some cases it may be desirable to apply to the exterior of electrical members a cup-like shell of a temporary surface coating having some of the properties of the thick resinous material. For example, cellulose acetate or other acyl cellulose ester in a relatively viscous state may be applied to the exterior of electrical members so that an open-end cup-like shell is produced. After the shell has been filled with the thin resinous composition and hardened, the cellulose acetate shell may be stripped from the exterior of the electrical member and the entire electrical member dipped in a thick resinous material to provide a permanent exterior weather-resisting protective coating of the type used in Fig. 1 of the drawings. Advantages arising from the use of cellulose acetate are that in some cases the thin impregnating composition having about 90% monostyrene solvent exerts a softening effect on the outer shell even though polymerized to a thermoset state. Cellulose acetate is not as soluble in the monostyrene and, therefore, better results may be obtained under these conditions.

Railway motor coils have been encapsulated by first dipping them in a thick resinous material such as that of Example I to provide a surface coating leaving only a small portion of one end of a coil uncoated. After a treatment to polymerize the surface coating of resinous material, the coil was impregnated with a thin resinous composition in a vacuum impregnating chamber to fill the interior through the uncoated end, and hardened by heat treatment. The final application of a cap to the exterior of the coil to provide a complete surface coating produced a completely insulated and practically solid filled coil.

It will be apparent that almost any type of electrical member may be practically solidly impregnated with the thin resinous composition by the process described herein. The solid solventless resinous composition applied as an impregnant provides for better conduction of heat than achieved in the prior art impregnating practice using volatile solvent varnish compositions that required evaporation of the solvent before polymerization. The insulation characteristics of the electrical members produced by the practice of the present invention are unparalleled, both as to breakdown strength and resistance to the deleterious effects of moisture and other materials to which electrical apparatus may be subjected. Even members sealed in a metal container filled with an insulating dielectric liquid have failed when subjected to conditions of use where the present invention has been satisfactorily employed for prolonged periods of time.

Various insulating varnishes, such for example, as are employed at the present time in coating electrical conductors, may be applied to the exterior of electrical members if prepared with a minimum of solvent and incorporating sufficient finely divided inorganic solids to attain suitable thixotropic properties to provide a coating of adequate thickness on the member. It may be necessary, however, with some coating compositions to apply a plurality of coatings before a sufficiently thick and non-porous exterior layer is obtained. Polyvinyl acetals suitably thickened with finely divided mica may be employed as the exterior coating material. The reaction products of maleic anhydride and styrene in a viscous and thixotropic state have been employed for the same purpose. Alkyd resins alone or combined with the castor oil-maleate and dissolved in monostyrene can be used for both coating and impregnating members.

Both volatile solvents and copolymerizing solvents such as monostyrene, diallyl phthalate, methyl methacrylate and similar monomeric materials that are good solvents for a resin base may be employed for the purpose of providing the outer cup-like shell coating. Since the outer coating is not harmfully affected thereby, the use of volatile solvents which do not take part in the reaction is permissible.

Since certain changes may be made in the above invention and different embodiments of the invention may be made without departing from the scope thereof, it is intended that all matter contained in the above described disclosure shall be interpreted as illustrative and not in a limiting sense.

We claim as our invention:

1. An encapsulated electrical transformer comprising a coil composed of turns of a conductor having interstices between them and a magnetic core associated in spaced relation to the coil, a hardened resinous insulation applied to the coil and magnetic core, the resinous insulation having penetrated the interstices and spaces and substantially completely filling them, and an outer completely enveloping covering of a dip-coated resinous composition of a thickness of from 5 mils to 1/16 of an inch conforming closely to the contour of and applied about the exterior of the coil and core and the hardened resinous material applied thereto, the covering composed of overlapping layers of resinous composition, the innermost layer being of substantially uniform thickness, covering the major portion of the surface of the coil and core but less than all the coil and core surface to provide an opening, the resinous insulation impregnating the interstices exhibiting a free liquid flowed condition without the use of pressure and the conductors being free from the distortion occasioned by use of pressure in applying the resinous insulation and the resinous insulation hardened in situ, and the level of the resinous insulation being even with the edge of the innermost layer of the outer covering, and a superposed layer covering the opening in the innermost layer, the superposed layer adherently overlapping the innermost layer to provide a tight seal between the layers.

2. An encapsulated electrical member comprising, in combination, a coil comprising an electrical conductor, resinous insulation in a free liquid flowed condition solidly impregnating the interstices of the coil and insulating the conductor, the coil being free from distortion as would be occasioned by forcing into it the resinous insulation under mechanical pressure, and an outer flexible weather-resisting, dip-coated resinous encapsulating shell applied to the entire outer surface of the resin impregnated coil and forming the exterior surface of the member, the encapsulating shell closely conforming to the contours of the coil, the encapsulating shell composed of at least two thin layers of a resinous material, the innermost layer being applied to a major proportion of the exterior of the member to provide an open, cup-like shell, each of the layers being of a substantially uniform thickness and having overlapping portions providing a tight, weather-resisting seal between the layers.

3. An encapsulated electrical member comprising, in combination, a coil comprising an electric conductor, resinous insulation in a free liquid flowed condition solidly impregnating the interstices of the coil and insulating the conductor, the coil being free from distortion as would be occasioned by forcing into it the resinous insulation under mechanical pressure, and an outer flexible, weather-resisting, dip-coated resinous encapsulating shell applied to the entire outer surface of the resin impregnated coil and forming the exterior of the electrical member, the encapsulating shell closely conforming to the contours of the coil and the electrical member, the encapsulating shell composed of at least two thin layers of a resinous material carrying a finely divided solid filler, the innermost layer being applied to a major proportion of the exterior of the member to provide an open ended, cup-like shell, the impregnating resinous insulation applied to the coil in contact with and filling the shell to a level even with the top of the cup-like shell, each of the layers being of substantially uniform thickness and having overlapping portions providing a tight, weather-resisting seal between the layers.

4. An encapsulated electrical member comprising, in combination, a coil comprising an electrical conductor, resinous insulation in a free liquid flowed condition solidly impregnating the interstices of the coil and insulating the conductor, the coil being free from distortion as would be occasioned by forcing into it the resinous insulation under mechanical pressure, and an outer flexible, weather-resisting, dip-coated resinous encapsulating shell applied to the entire outer surface of the resin impregnated coil and forming the exterior of the electrical member, the encapsulating shell closely conforming to the contours of the coil and the electrical member, the encapsulating shell composed of at least two thin layers of a resinous material carrying a finely divided solid filler, the filler composed of mica in an amount of at least 25% of the weight of the layer, the innermost layer being applied to a major proportion of the exterior of the member to provide an open ended, cup-like shell, the impregnating resinous insulation applied to the coil in contact with and filling the shell to a level even with the top of the cup-like shell, each of the layers being of substantially uniform thickness and having overlapping portions providing a tight, weather-resisting seal between the layers.

5. An encapsulated electrical transformer comprising a magnetic coil comprising turns of an electrical conductor and a laminated magnetic core disposed in operative spaced relation to the coil, a hardened resinous material solidly impregnated into the interstices of the coil and laminated magnetic core, and an outer flexible, weather-resisting, dip-coated resinous encapsulating shell applied completely about the resin impregnated coil and core, the encapsulating shell conforming closely to the contour and applied upon the entire exterior surfaces of the impregnated coil and core, the encapsulating shell composed of thin overlapping layers of the resinous material, the innermost layer applied to a major proportion of the entire exterior surface of the coil and core to contain them in an open-ended cup-like shell so that little of the coil and core project above the opening, the impregnating resin filling the coil and core up to the level of the opening and exhibiting a free liquid flowed condition, and the superposed layer covering the opening and overlapping the innermost layer to provide a tight seal between the layers.

CHARLES F. HILL.
NEWTON C. FOSTER.

REFERENCES CITED

The following references are of record in the file of this patent:

UNITED STATES PATENTS

| Number | Name | Date |
| --- | --- | --- |
| 1,010,444 | Mitchell | Dec. 5, 1911 |
| 1,102,633 | Aylsworth | July 7, 1914 |
| 1,333,004 | Vaughn | Mar. 9, 1920 |
| 1,796,421 | Apple | Mar. 17, 1931 |
| 1,816,680 | Kurath | July 28, 1931 |
| 1,827,571 | Feine | Oct. 13, 1931 |
| 1,874,722 | Turner | Aug. 30, 1932 |
| 1,883,932 | Kazenmaier | Oct. 25, 1932 |
| 1,900,093 | Blake et al. | Mar. 7, 1933 |
| 1,911,341 | Apple | May 30, 1933 |
| 1,921,111 | Apple | Aug. 8, 1933 |
| 1,922,272 | Bender | Aug. 15, 1933 |
| 2,172,445 | Lutz | Sept. 12, 1939 |
| 2,372,074 | Ford | Mar. 20, 1945 |
| 2,414,525 | Hill | Jan. 21, 1947 |